United States Patent [19]
Hoos

[11] 3,855,602
[45] Dec. 17, 1974

[54] A CAMERA FLASH BRACKET

[76] Inventor: Gerald W. Hoos, 1035 Wesley, Evanston, Ill. 60202

[22] Filed: Aug. 23, 1973

[21] Appl. No.: 391,028

[52] U.S. Cl. .............................................. 354/293
[51] Int. Cl. ........................................... G03b 17/56
[58] Field of Search ........ 95/11.5, 86; 240/1.3, 2 C; 354/293

[56] References Cited
UNITED STATES PATENTS
3,550,519  12/1970  Lewis.................................. 95/86

Primary Examiner—John M. Horan
Attorney, Agent, or Firm—Hill, Gross, Simpson, Van Santen, Steadman, Chiara & Simpson

[57] ABSTRACT

A bracket having a member with the base portion on which a camera can be detachably secured and a second portion supporting a pivoting arm which in turn rotatably supports a member on which a flash attachment may be detachably connected. The bracket enables positioning the center of the lens of the flash attachment over the center of the lens of the camera regardless of whether the camera is used in a horizontal or vertical format and enables positioning the flash attachment in any intermediate position. Due to the rotatable connection between the arm and the member mounting the flash attachment, the axis of the beam of light from the flash attaching can be adjusted in any desired relationship to the axis of the lens of the camera.

8 Claims, 6 Drawing Figures

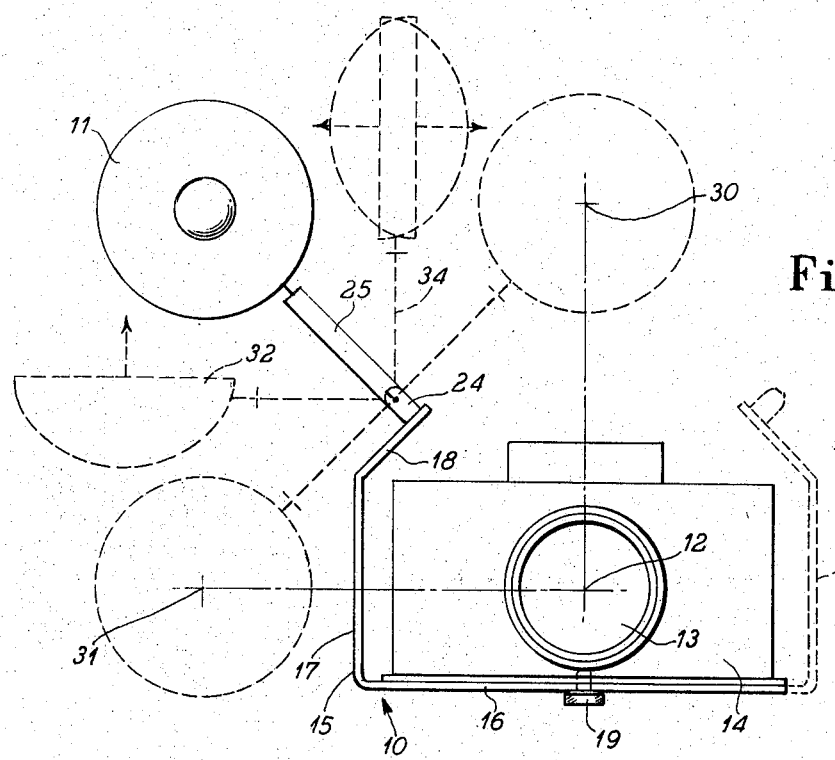
Fig. 1
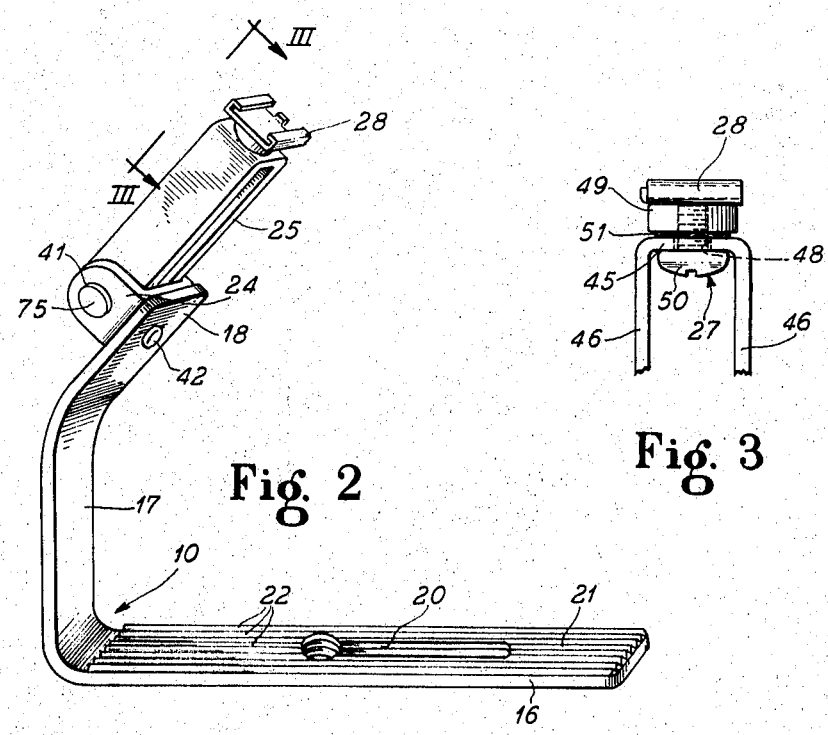
Fig. 2
Fig. 3

A CAMERA FLASH BRACKET

BACKGROUND OF THE INVENTION

1. Field of the Invention

The present invention is directed to a bracket for supporting a camera and a flash attachment relative to each other.

2. Prior Art

When using a flash attachment or unit with a hand held camera, problems occur with controlling the amount of shadows that will be present in the picture. One technique of obtaining no shadows in a photograph is the bounce technique. It is known to provide a bracket for supporting a flash unit of attachment on a camera which allows pivoting of the flash unit from a position with it directed towards the subject being photographed to a position which bounces the light on a ceiling or wall to enable using the bounce flash technique to obtain a shadowless picture.

It is also desirable to be able to position the flash in different relative positions with respect to the center of the lens in order to eliminate side shadows or to control the amount of side shadows. For example, if the center of the reflector of the flash attachment is positioned above the center of the lens, a direct flash photography without side shadows can be obtained; however, the distance of the center of the reflector above the center of the lens must be sufficient in order to prevent the occurrence of "red eye" which is due to the reflection of the flash in the eyes of the person whose picture is being taken. Furthermore, since the camera may be used to take pictures in either a "horizontal" or a "vertical" format, the centering of the flash attachment over the center of the lens must enable the centering of the reflector of the flash attachment over the lens regardless of the orientation of the camera.

SUMMARY OF THE INVENTION

The present invention is directed to a bracket which supports the camera and supports a flash attachment or unit in relative positions with respect to the center of the lens of the camera so that the attachment can be adjusted to any position between a position with the reflector of the flash unit extending above the center of the lens to a second position which is at an angle of 90° thereto. In addition, the bracket enables aligning the axis of the beam of light originating in the reflector of the flash unit to be parallel or at any orientation to the focal axis of the lens of the camera and the bracket positions the reflector of the flash unit a sufficient distance from the lens of the camera to prevent the occurrence of "red eye" during a direct flash technique.

The invention accomplishes this purpose by utilizing a bracket having a portion for supporting the camera which includes means for attaching or securing the camera thereto and a second portion which supports a first arm which is pivotably connected to a second arm that can pivot through an angle of 180° and the flash attachment is attached onto a flash mounting member which is mounted for rotation on the second arm. In one embodiment, the two arms have a U-shaped configuration and the mounting member is an accessory shoe which can be rotated through 360° on the second arm. In the second embodiment, the mounting member has a U-shape which is rotatably connected on a pair of flanges of the second arm which flanges extend parallel to the pivot axis of the means connecting the second arm to the first arm.

BRIEF DESCRIPTION OF THE DRAWINGS

FIG. 1 is a schematic presentation of the bracket of the present invention illustrating various positions of the flash attachment relative to the center of a lens of a camera supporting the bracket;

FIG. 2 is a perspective view of one embodiment of the present invention;

FIG. 3 is a partial view taken along lines III—III of FIG. 2;

DESCRIPTION OF THE PREFERRED EMBODIMENTS

The principles of the present invention are particularly useful in a bracket generally indicated at 10 for supporting a flash attachment or unit having a reflector 11 relative to a center 12 of a lens 13 of a camera 14 as illustrated in FIG. 1.

Figure 4:
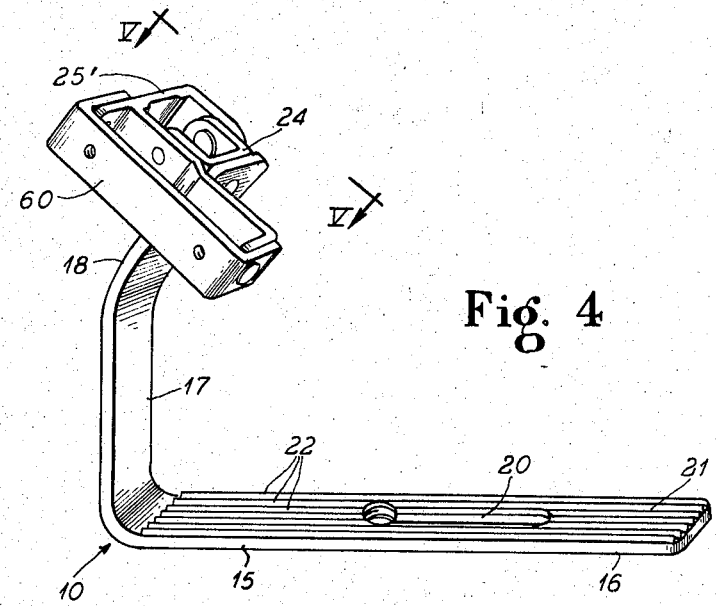
FIG. 4 is a perspective view of a second embodiment of the present invention.

The bracket 10 includes a one piece member 15 having a first portion 16, a second portion 17 which extends at right angles to the first portion 16 and terminates in a third portion 18 which extends at a 45° angle to both the second portions 17 and the first portion 16. The first portion 16 provides a base for receiving a camera 14 and has means for attaching the camera thereon. The means for attaching the camera 14 onto the base 16 includes a knob 19 which extends through a slot 20 (FIG. 2) which allows adjustment of the position on the base 16 and threadably engages a threaded mounting opening in the base of the camera 14. The upper surface of the base or first portion 16 is provided with a pad 21 which is illustrated in FIGS. 2 and 4 has a plurality of grooves 22 extending along the length of the first portion 16. The grooves 22 facilitate securing of the camera 14 onto the first portion 16 and preventing relative rotation between the first portion 16 and the camera as the attachment means tightly secures the camera to the bracket 10.

The second portion 17 which extends at 90° to the first portion 16 has sufficient height as illustrated in FIG. 1 to clear the upper portion of the camera and then terminates in the third portion 18. A first arm 24 is secured onto the third portion 18 and a second arm 25 is mounted or connected for pivotable movement through an arc of 180° relative to the first arm 24. Rotatably connected to the second arm 25 by a second connecting means, generally indicated at 27 in FIG. 3, is a flash mounting member such as in an accessory shoe 28.

As illustrated in FIG. 1, the reflector of the flash unit 11 can be moved relative to the lens 13 by pivoting of the second arm 25 relative to the first arm 24. By pivoting the second arm 25 through an arc of 180° the reflector can be moved from a first position 30 with the center of the reflector directly above the center 12 of the lens 13 to a second position 31 with the reflector being offset 90° from the first position 30. The second position 31 places the reflector directly over the center 12 of the lens 13 when the camera was used in a vertical format. If the camera is used in a horizontal format, as illustrated in FIG. 1, the position 30 would produce a photograph without any side shadows, and the center of the reflector is a sufficient distance from the lens 12 to prevent the occurrence of "red eye."

The flash attachment 11 can be positioned in any intermediate positions between positions 30 and 31 which enables the photographer to control the amount of side shadows created by a direct flash picture. In addition thereto, by moving the arm 25 to a position illustrated in dash lines as position 32 and by rotating the mounting member such as the accessory shoe 28 on the second arm 25 the reflector can direct the flash towards the ceiling for a bounce flash technique of photography. In a similar manner, by positioning of the arm 25 in a position illustrated in dash lines at 34 and by rotating the mounting member in either direction, a bounce flash technique by bouncing the flash on either side wall can be utilized. Finally, the rotatable connecting means for connecting the flash mounting member or plate onto the second arm enables the photographer to adjust the orientation of the flash unit whether it is a conventional flash bulb or an electronic flash unit to assume any orientation relative to the axis of the lens 13 and provide any desired lighting of the object or persons being photographed.

Due to the configuration of the member 15 and particularly the second portion 17 relative to the first portion 16 and the third portion 18, the portion 17 provides a convenient handle for gripping the bracket 10 with the camera 14 and the flash unit secured thereon. While the bracket 10 is illustrated to be on the right hand side of the camera, it can be easily mounted on the left hand side as illustrated in dash lines 35.

Figure 5:
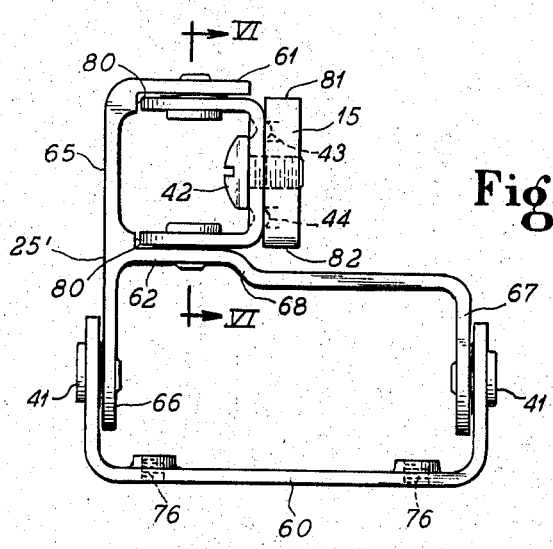
FIG. 5 is a plan view taken along lines V—V of FIG. 4.
Figure 6:
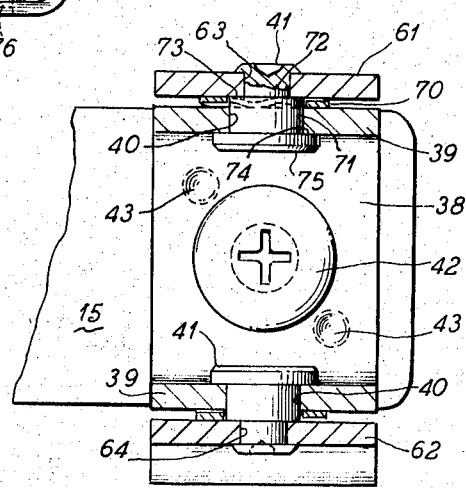
FIG. 6 is a cross-section taken along lines VI—VI of FIG. 5.

In the two structural embodiments illustrated in FIGS. 2–6, the first arm 24 is structurally the same. As best illustrated in FIGS. 5 and 6, arm 24 has a U-shaped configuration comprising a base 38 interconnecting a pair of flanges 39, 39 which are provided with aligned apertures 40 that receive rivets 41. The arm 24 is connected onto the member 15 by a threaded fastener 42 and to ensure proper alignment of the arm on the member 15, the member and the base portion 38 are provided with coacting projections 43 and recesses 44. As illustrated, the projections 43 are formed by embossing the base 38 and the recesses are formed by a pair of blind holes in the member 15. The projections 43 and recesses 44 are aligned so that the arm 24 can be rotated on the member 15 between two positions which are 180° apart.

The second arm (FIGS. 2 and 3) is a U-shaped member having a base 45 which interconnects a pair of flanges 46. The flanges 46 adjacent the end opposite the base 45 have aligned apertures which receive the connecting means such as the rivet 41. The base 45 is provided with an aperture 48. The mounting member for the flash attachment is illustrated as an accessory shoe 28 which is attached to a disc or hub 49 which is provided with a threaded bore. To attach the hub and accessory shoe onto the second arm 25, a threaded fastener 50 extending through the aperture 48 receives an element 51 such as a wave washer or spring washer and is threaded into the bore of the hub 49. The length of the threaded portion of the threaded fastener 50 is selected so that as the threaded fastener bottoms on the accessory shoe 28, the spring element 51 is placed in the desired amount of compression to produce sufficient friction forces to maintain the accessory shoe 28 along with the flash unit in any position to which the shoe is rotated. Thus, the connecting means for interconnecting the mounting member to the second arm is formed by a threaded fastener 50, the friction element 51 in conjunction with the threaded bore in the hub 49.

The means connecting the second arm 25 to the first arm 24 which include the rivets 41 also provides a frictional lock to maintain the arm 25 in any selected position as it is pivoted relative to the first arm 24. The connecting means utilizes spring or wave washers as elements disposed between the flanges 46 of the second arm 25 and flanges 39 of the first arm 24. These wave washers or spring elements maintain the desired frictional forces between the two arms 24 and 25 to frictionally lock the arm 25 in any desired or set position.

A second embodiment of the bracket 10 is illustrated in FIGS. 4, 5 and 6 and utilizes the same member 15 along with the same structure for the first arm 24. The variations in the second embodiment are in the structure of the second arm which is designated 25' and in the structure of the mounting member which is the plate 60.

The second arm 25' (FIG. 5) has a pair of flanges formed by a flange 61 and a flange 62. The flanges 61 and 62 as illustrated in FIG. 6 have a pair of aligned apertures 63 and 64, respectively, which coact with the rivets 41 to form the means connecting the first arm 24 to the second arm 25'.

The first pair of flanges formed by a flange 61 and 62 are interconnected by a base portion 65 which extends past the flange 62 and forms a third flange 66. The flange 62 has a greater length than the flange 61 and terminates in a fourth flange 67 which coacts with the third flange 66 to form a second pair of flanges. Each of the flanges 66 and 67 is provided with aligned apertures for receiving rivets similar to the rivet 41 to provide a connecting means for interconnecting flanges on the mounting member 60 to the second arm 25'. As illustrated, the flange 62 is provided with an offset 68 which ensures the clearance of the flanges on the mounting member 60 as it is pivoted through an arc of 180°.

To provide a frictional locking for the means connecting the arms such as 25' and 24, the rivets 41 interconnect the flanges of each of the arms 24 and 25' and entrap a spring element 70 which may be a wave washer or spring washer therebetween. To ensure the proper compression on the spring element 70 to provide the necessary and desirable frictional forces between the two arms to provide the frictional lock, the rivet 41 is provided with a large diameter portion 71 and a small diameter portion 72 which provide an intermediate shoulder 73. When the rivet is assembled in the aperture such as 40 and 63, the shoulder 73 engages the surface of the flange such as 61 as the small diameter portion 72 extending through the aperture 63 which is smaller than the aperture 40. When the rivet is headed to complete the connection, the distance between the shoulder 73 and a shoulder 74, which is formed by the head 75 of the rivet, is such to ensure the proper amount of compression on the spring element 70 to produce the desired frictional forces for the frictional lock. It should be noted that the rivet connection is used for the connecting means for interconnecting the second arm to the first arm 24 in both embodiments and is also utilized for interconnecting the mounting member 60 to the second pair of flanges of the second arm 25' of the second embodiment.

Preferably, the second arm 25' is formed from an extrusion having a cross-sectional shape such as illustrated in FIG. 5. It should be pointed out that the second pair of flanges formed by the flanges 66 and 67 extend parallel to the axis of the connecting means which interconnects the second arm 25' to the first arm 24, so that the axis of the connecting means interconnecting the mounting member 60 to the second pair of flanges extends at right angles to the first mentioned connecting means.

As mentioned above, the second arms 25 or 25' of each embodiment are mounted to swing or pivot through an arc of 180°. Since the flanges 46 of the second arm 25 of the first embodiment are received in the flanges 39 of the first arm 24, the position of the aperture 40 relative to the base 38 are selected so that the base 38 engages the side edges of the flange 46 of the second arm 25 to act as a stop to limit the pivotal movement to an arc of 180°. Since the apertures 40 are of a size to receive the large diameter portion 71 of the rivets 41, the heads 75 of the rivets 41 are located on the external surface of the flange 39 instead of on the internal surfaces as illustrated in FIG. 6, which illustrates the connection between the first and second arms of the second embodiment. Since the flanges 61 and 62 of the arm 25' of the second embodiment receives the flange 39 of the first arm 24 (FIG. 5), the extrusion forming the second arm is provided with a pair of stops 80 which coact with the opposite side edges of the flange 39 of the first arm to limit the swing or pivotal movement of the second arm 25' to an arc of 180°.

The mounting member 60 is provided with threaded apertures such as 76 to enable attachment or mounting of a flash attachment such as an electronic flash or a conventional flash bulb unit. The embodiment of the bracket shown in FIGS. 4 and 5 is designed for use with heavier flash attachments or units such as utilized by professional photographers whereas the embodiment illustrated in FIG. 2 is for use with lighter weight flash units which are primarily for amateur photography. The heavier flash unit is mounted with its handle extending parallel to the bracket 60 and the second arm is pivoted through 180° to place the reflector of the unit between the first and second positions illustrated in FIG. 1. As illustrated in FIG. 4, the bracket is selected for the intermediate position which is shown in bold lines in FIG. 1.

In the second embodiment of FIG. 4, the mounting member 60 is pivotable only through 180°. If the bracket of the second embodiment is to be attached with the handle formed by the second portion 17 being on the left hand side of the camera, it is necessary to rotate the first arm 180° from the position shown in FIG. 5. This is accomplished by untightening the threaded fastener 42, rotating the first arm 24 through 180° until the projections 43 are received in the recesses 44 and then by retightening the fastener 42. This will place the flange 62 adjacent edge 81 instead of edge 82 of the member 15 as illustrated in FIG. 5. The coaction of the recesses and projections ensures that arm 24 is in the correct position so that the axis formed by the pivots extend perpendicular to the plane defined by the portions 16, 17 and 18 of the member 15 and that the secured arm pivot in a plane parallel to the plane defined by the portion of the member 15.

For purposes of storage and for purposes of packaging the bracket of the second embodiment, it is desirable that the bracket be as flat as possible. By unfastening the fastener 42, the first arm 24 can be rotated 90° to reduce the overall width of the bracket 10 for storage or for purposes of packaging.

When mounting a camera on the bracket, the camera's position on the base portion 16 is adjusted so that the center 12 of the lens 13 is directly beneath the center of the reflector of the flash unit when the flash unit is in the first position 30. In the first embodiment, the length of the arm 25 was selected in view of the fact that substantially all of the flash units have substantially the same distance between the center of the reflector and the attachment shoe. In the second embodiment, the flash unit is positioned on the mounting member or plate 60 so that the center of the reflector will move from position 30 to position 31 as the second arm 25' is pivoted through an arc of 180°.

Although various minor modifications might be suggested by those versed in the art, it should be understood that I wish to employ within the scope of the patent warranted herein all such modifications as reasonably and properly come within the scope of my contribution to the art.

I claim:

1. A bracket for attachment to a camera to position a flash attachment at different relative positions to a lens of the camera, comprising a one piece member having a first portion with a second portion extending from one end of the first portion at an angle of approximately 90° thereto, said member having a third portion extending from an end of the second portion over the first portion at an angle of approximately 45° to both of the first and second portions, said first portion providing a base for receiving the camera and having means for attaching a camera thereon, a first arm connected to the third portion, a second arm, means for connecting the second arm to the first arm, said connecting means enabling pivotal movement of the second arm through an arc which lies in a plane extending parallel to a plane defined by said first, second and third portions, said means for connecting the second arm to the first arm including an element maintaining a constant frictional lock therebetween to maintain the relationship of the arms in any position to which they are pivoted, said first and second arms having means coacting to provide stops for limiting the pivotal movement of the second arm to a 180° arc, a flash mounting member, and means for rotatably connecting the mounting member onto the second arm so that the flash attachment received on the mounting member can be selectively and adjustably positioned along an arc between a first position disposed over the center of the lens of the camera to a second position which is offset 90° therefrom and the orientation of the flash attachment can be rotated through an angle of at least 180°.

2. A bracket according to claim 1, wherein the means for rotatably connecting said flash mounting means on said second arm includes a friction producing element to provide a frictional lock of the flash mounting means in any position to which it is set.

3. A bracket for attachment to a camera to position a flash attachment at different relative positions to a lens of the camera, comprising a one piece member having a first portion with a second portion extending from one end of the first portion at an angle thereto, said first portion providing a base for receiving the camera and having means for attaching a camera thereon, a first arm, a second arm, means for connecting the second arm to the first arm, said first arm being a U-shaped member having a base with a pair of upstanding flanges, said base being connected to the second portion with the flanges being engaged by the means connecting the second arm to the first arm, said connecting means enabling pivotal movement of the second arm through a 180° arc which lies in a plane extending parallel to a plane defined by said first and second portions, a flash mounting member, and means for rotatably connecting the mounting member onto the second arm so that the flash attachment received on the mounting member can be selectively and adjustably positioned along an arc between a first position disposed over the center of the lens of the camera to a second position which is offset 90° therefrom and the orientation of the flash attachment can be rotated through an angle of at least 180°.

4. A bracket according to claim 3, wherein the second arm comprises a base member with a pair of flanges extending therefrom, each of the flanges at an end opposite the base member being provided with apertures receiving the connecting means, said base of the second arm being provided with an aperture for receiving the means for connecting the flash mounting member on said second arm which connecting means enables rotation through 360°.

5. A bracket according to claim 3, wherein said first arm is detachably connected on said second portion and said second portion and said first arm have coacting projections and recesses to ensure proper orientation of the arm on the second portion.

6. A bracket according to claim 5, wherein said second arm has a first pair of flanges and a second pair of flanges extending at right angles to the first pair of flanges, said first pair of flanges having apertures for receiving the connecting means for pivotably connecting the second arm to the first arm, said second pair of flanges have aligned apertures for receiving the connecting means which rotatably connects the flash mounting member onto the second arm.

7. A bracket according to claim 6, wherein said flash mounting member is a U-shaped member having flanges receiving the second pair of flanges of the second arm, and wherein said means for connecting the flash mounting member on the second arm enables rotational movement through an arc of 180°.

8. A bracket according to claim 7, wherein one of said first pair of flanges of the second arm is longer than the other flange of said first pair, said one flange having an offset portion and terminating in a flange of the second pair, said offset portion providing clearance of the extended portion of the one flange as the second arm is pivoted through 180° on the first arm.

* * * * *